United States Patent [19]

Kimura

[11] 4,354,013
[45] Oct. 12, 1982

[54] PROCESS FOR PREPARING EPOXY-MODIFIED SILICONE RESINS

[75] Inventor: Hiroshi Kimura, Oota, Japan

[73] Assignee: Toshiba Silicone Co., Ltd., Tokyo, Japan

[21] Appl. No.: 224,973

[22] Filed: Jan. 14, 1981

[30] Foreign Application Priority Data

Jan. 22, 1980 [JP] Japan .................................. 55-5314

[51] Int. Cl.³ ...................... C08L 83/04; C08G 77/08; C08G 77/40
[52] U.S. Cl. ................................... 528/16; 525/476; 525/507; 525/523; 528/17; 528/27
[58] Field of Search ................. 525/476, 523; 528/16, 528/17, 27

[56] References Cited

U.S. PATENT DOCUMENTS

| | | | |
|---|---|---|---|
| 3,324,080 | 6/1967 | Hicks ..................................... | 528/17 |
| 3,474,069 | 10/1969 | Thomas ................................ | 528/17 |
| 3,491,054 | 1/1970 | Thomas ................................ | 528/16 |
| 3,779,988 | 12/1973 | Rembold et al. .................. | 525/476 |

FOREIGN PATENT DOCUMENTS 569378 1/1959 Canada .............................. 525/523

Primary Examiner—Wilbert J. Briggs, Sr.
Attorney, Agent, or Firm—Blanchard, Flynn, Thiel, Boutell & Tanis

[57] ABSTRACT

A process for preparing an epoxy-modified silicone resin which comprises reacting (A) an organosilicon compound containing substantially no hydroxyl groups directly bonded to the silicon atom and having the mean formula $$R^1_a Si(OR^2)_b O_{(4-a-b)/2}$$

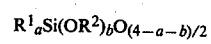

in which each of $R^1$ and $R^2$ individually represents a substituted or unsubstituted monovalent hydrocarbon group, and a and b are in the ranges of $0 \leq a < 3$, $0.001 \leq b \leq 4$, and $a+b \leq 4$, with (B) an epoxy compound containing at least one epoxy group and at least one hydroxyl group per molecule, in the presence of (C) a chelate compound selected from the group consisting of aluminum chelates and zirconium chelates.

11 Claims, No Drawings

PROCESS FOR PREPARING EPOXY-MODIFIED SILICONE RESINS

This invention relates to a process for preparing epoxy-modified silicone resins.

The epoxy-modified silicone resin of the invention is excellent in various characteristics such as heat resistance, chemical resistance, corrosion resistance and adhesion, and is employed as a vehicle for a variety of coating materials such as heat resistant paint, corrosion resistant paint, chemical resistant paint and solvent resistant paint.

As a process for preparing an epoxy-modified silicone resin, there is known a process comprising the dealcoholation condensation or the dehydration condensation of an organosilicon compound having an alkoxy or hydroxyl group attached to the silicon atom, and an epoxy compound in the presence of a catalyst such as p-toluenesulfonic acid or trifluoroacetic acid. When a high molecular weight compound is employed as the organosilicon compound or the epoxy compound, these reactants do not become a homogeneous, transparent solution, but become cloudy in the course of the reaction, and cause a gelation.

Japanese Patent Publication No. 53(1978)-9640 proposes a process employing an alkali halide or a combination of the alkali halide with a titanic acid ester as the catalyst which purports to avoid this drawback. However, this process still has other drawbacks in that the reaction temperature is high and the reaction period is long. Moreover, a coated film prepared from the epoxy-modified silicone resin through this process shows no excellent characteristics that are inherently provided to the modified resin, unless the film is cured at an elevated temperature for a long period. If the curing for the hardening is to be conducted at a relatively low temperature, an aromatic polyamine or an acid anhydride compound should be incorporated. Otherwise, the resin to be coated should be sufficiently modified as soon as the resin is heated upon the incorporation of these additives to reach a condition just prior to the gelation. For details refer to Japanese Patent Publication No. 53(1978)-9640 and Japanese Patent Provisional Publication No. 50(1975)-153063. However, the composition incorporated with these additives is prone to reaction of the epoxy groups when it is stored for a long period resulting in increase of the viscosity or gelation. Moreover, the incorporation of the compounds extremely reduces the heat resistance of the coated film.

As other proposed processes for the reaction between the organosilicon compound having a hydroxyl group attached to the silicon atom (an alkoxy group may or may not be attached to the silicon atom) and the epoxy compound, there has been disclosed a process employing a boron compound or a titanium compound as the catalyst for the reaction of the epoxy compound (Japanese Patent Publication No. 54(1979)-37998) and a process employing an aluminum alcoholate, an aluminum acylate, a salt of the aluminum acylate or alkoxide, an aluminosiloxy compound, or an aluminum chelate as the catalyst (Japanese Patent Publication No. 53(1978)-19710). The former process gives a composition which turns tack-free at a relatively low temperature, for instance, 150° C. within 10-60 min., as described in the examples in the specification, and no complete hardening can be achieved under these conditions. To obtain a coated film with satisfactory mechanical properties and solvent resistance, the heating should be conducted at 200° C. for 30 min. The latter process is suitable for obtaining a resin powder for molding. However, the product of this process cannot be employed as the vehicle for coating materials, this application being an object of the present invention, because the reaction mixture undergoes gelation when the reaction is carried out in a solution.

As a result of the study for obtaining a stable epoxy-modified silicone resin which is free from these drawbacks, the present inventors have now discovered that an epoxy-modified silicone resin which is obtained by reacting an organosilicon compound having a reactive alkoxy group attached to the silicon atom and containing substantially no hydroxyl group directly attached to the silicon atom, with an epoxy compound containing hydroxyl groups in the presence of an aluminum chelate or a zirconium chelate to cause a reaction between the alkoxy group of the organosilicon compound and the hydroxyl group of the epoxy compound, gives an excellent film upon heating for a relatively short period at a relatively low temperature. The inventors have further discovered that the resin solution obtained by the above-described process is highly stable so that increase of the viscosity and gelation hardly take place. The present invention has been completed on the basis of discovery. The epoxy-modified silicone resin according to the present invention enables the formation of a satisfactory film, even when a hardening agent for epoxy resins such as an amine or an acid anhydride is employed.

Accordingly, the present invention provides a process for preparing an epoxy-modified silicone resin which comprises reacting (A) an organosilicon compound containing substantially no hydroxyl groups directly bonded to the silicon atom and having the mean constitutional formula

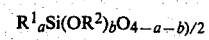

$$R^1{}_a Si(OR^2)_b O_{4-a-b)/2}$$

in which each of $R^1$ and $R^2$ individually represents a substituted or unsubstituted monovalent hydrocarbon group, and a and b are in the ranges of $0 \leq a < 3$, $0.001 \leq b \leq 4$, and $a+b \leq 4$, with (B) an epoxy compound containing at least one epoxy group and at least one hydroxyl group per molecule, in the presence of (C) a chelate compound selected from the group consisting of aluminum chelates and zirconium chelates.

The present invention is characterized in that the reaction for dealcoholation of the alkoxy group of the organosilicon compound and the hydroxyl group of the epoxy compound is carried out in the presence of a catalyst consisting of the chelate compound designated as the (C) component and in that the organosilicon compound employed contains no hydroxyl groups attached to the silicon atom. The employment of the (C) component as the catalyst enables the dealcoholation reaction to be carried out at a low temperature and for a short period, with no limitation on the reactants. For instance, there is no requirement that each of the (A) and (B) components necessarily is one having a low molecular weight or one having a specified molecular structure. Moreover, the epoxy-modified silicone resin thus obtained gives a film having excellent properties upon drying by heating at a low temperature and for a short period.

The employment of an aluminum compound such as an aluminum alcoholate or an aluminum chelate for the reaction between an organosilicon compound and an epoxy compound is already disclosed in Japanese Patent Publication No. 53 (1978)-29720. This publication discloses a composition obtained by mixing an organosilicon compound having a hydroxyl group attached to the silicon atom, an epoxy-compound, an organosilicon compound having a hydrogen atom attached to the silicon atom and the above-described aluminum compound. The object of the invention described in the publication is to mold the composition and incorporate therein an inorganic filler. In this art, the aluminum compound is incorporated to accelerate the reaction between the hydroxyl group of the organosilicon compound and the epoxy group of the epoxy compound in the course of hardening of the composition.

In contrast to the prior art, the chelate compound of the present invention serves to react the alkoxy group of the organosilicon compound with the hydroxyl group of the epoxy compound to prepare the epoxy-modified silicone resin. If the organosilicon compound has a hydroxyl group attached to the silicon atom, the reaction with the epoxy compound results in gelation. Accordingly, such hydroxyl group should not be present in the organosilicon compound for the employment in the process of the present invention. This feature entirely differentiates the present invention from the art disclosed in the Japanese Patent Publication No. 53(1978)-29720.

Each of the components employed in the present invention is further described as follows.

Examples of $R^1$ and $R^2$ of the aforementioned mean constitutional formula for the (A) component, namely, the organosilicon compound, include alkyl groups such as methyl, ethyl, propyl and butyl; alkenyl groups such as vinyl and allyl; aryl groups such as phenyl; and halogen-substituted hydrocarbon groups such as the above-mentioned groups with halogen substituents. In view of heat resistance of the resulting polyorganosiloxane resin, the rate of hardening, and availability of the starting materials, a combination of methyl and phenyl for $R^1$ is preferred. For $R^2$, methyl, ethyl or propyl is preferred in view of the reactivity. The value of a is limited to the range of $0 \leq a < 3$. A value of a within a range of $1 \leq a < 3$ is preferably selected so that the resulting hardened film may have excellent properties. The value of b is limited to the range of $0.001 \leq b \leq 4$. However, a value of b within a range of $0.3 \leq b \leq 4$ is preferably selected so that a homogeneously modified resin may be obtained. The value of a+b is subject to the limitation of $a+b \leq 4$.

As described hereinbefore, the organosilicon compound of the component (A) should not substantially have hydroxyl groups attached to the silicon atom. Examples of the organosilicon compounds of this type include organoalkoxysilanes such as tetraethoxysilane, diphenyldimethoxysilane, dimethyldimethoxysilane, methylphenyldimethoxysilane, phenyltrimethoxysilane, diphenyldiethoxysilane, dimethyldiethoxysilane, methylphenyldipropoxysilane, dimethylphenylmonomethoxysilane, and methylvinyldimethoxysilane; and siloxanes containing an alkoxy group attached to the silicon atom and having substantially no hydroxyl groups attached to the silicon atom which are obtained from one or more than one of the organoalkoxysilanes upon partial hydrolysis and condensation. The latter mentioned siloxanes can be prepared by reacting an organochlorosilane corresponding to the above-mentioned organoalkoxysilane with an alcohol and a small amount of water.

The epoxy compound of the (B) component is selected from those containing at least one epoxy group and at least one hydroxyl group in one molecule. Examples of the epoxy compounds include a partially epoxidated phenol-novolak resin; a bisphenol A type epoxy resin of mean polymerization degree higher than 2 obtained from bisphenol A and epichlorohydrin; and epoxy compounds obtained by modifying partially the epoxy resin with a fatty acid. The bisphenol A type epoxy resin is preferred, from the viewpoints of the heat resistance and economy.

The ratios of the (A) and (B) components are preferred to be 10–80% by weight for the (A) component and 90–20% by weight for the (B) component, based on the total amount of the (A) and (B) components. More preferably, the (A) and (B) components are 20–60% by weight and 80–40% by weight, respectively. If the (A) component is less than 10% by weight, the resulting resin becomes poor in heat resistance and corrosion resistance. On the other hand, if the (A) component is more than 80% by weight, the resulting resin becomes poor in solvent resistance and chemical resistance, even though the heat resistance is very satisfactory.

The chelate compound of the (C) component is selected from aluminum chelates and zirconium chelates, both of which wherein oxygen atoms serve as the coordinating atoms. Examples of the chelate compounds (C) include aluminum acetylacetonate, aluminum ethylacetoacetate, aluminum isobutylate ethylacetoacetate and zirconium acetylacetonate. From the viewpoint of acceleration of the reaction, the aluminum chelates are preferred. Particularly preferred is the aluminum acetylacetonate.

The amount of the chelate compound to be employed is preferably in the range of 0.005–50 weight parts based on the total 100 weight parts of the (A) and (B) components. More preferably the chelate compound is used in the range of 0.01–5 weight parts on the same basis. If the amount of the chelate compound is less than 0.005 weight part, the epoxy-modified silicone resin is difficult to obtain within a short period at a low temperature. On the other hand, if the amount is more than 50 weight parts, the resulting epoxy-modified silicone resin hardly has satisfactory properties.

The reaction for preparing the epoxy-modified silicone resin using the above-mentioned catalyst can be carried out, for instance, in a process employing no solvent or a process employing a solvent which dissolves both the organosilicon compound and the epoxy compound. The use of the solvent is preferred, because the use of the solvent facilitates control of the reaction. The reaction is carried out under continuous removal of the produced alcohol to the outside through distillation.

According to the process of the present invention, an epoxy-modified silicone resin is easily prepared within a short period at a low temperature because of the use of the specific chelate compound as the catalyst. Further, the reaction with the epoxy compound proceeds without occurrence of gelation because the organosilicon compound contains no hydroxyl group. The resin obtained according to this process hardens within a short period at a low temperature. Furthermore, the organosilicon compound is not required to be a low molecular weight compound. Accordingly, the so obtained resin yields a film of a sufficiently high molecular weight, so that the hardened film has excellent characteristics such as excellent water resistance, solvent resistance, corrosion resistance and chemical resistance.

The epoxy-modified silicone resin which is prepared by the present invention can be employed in a variety of uses such as a vehicle for heat resistance coating material, electric insulating varnish, a binder for electrophotographic material, and a vehicle for weather resistance coating material.

The present invention is further described by the following examples, in which the "part" means part by weight.

EXAMPLE 1

A silane mixture consisting of 1 mol of dimethyldichlorosilane, 1 mol of phenyltrichlorosilane and 1 mol of diphenyldichlorosilane was alkoxylated with 1.3 mol of water and 4.4 mol of methyl alcohol under removal of by-produced hydrochloric acid to give an organopolysiloxane having the mean constitutional formula:

$(CH_3)_{0.67}(C_6H_5)_{1.00}Si(OCH_3)_{1.47}O_{0.43}$

The so prepared organopolysiloxane (300 g) was mixed with 700 g of Epicote 1001 (trade name; available from Shell Chemical) and 400 g of toluene. The mixture was heated to 70° C. until the ingredients formed a homogeneous solution. To the solution was added 1 g of aluminum acetylacetonate, and the temperature of the mixture was elevated. When the temperature reached 95° C., methyl alcohol produced by the reaction began to distill together with the toluene. The reaction was then continued by maintaining the temperature at 115° C. The reaction was checked by observing the condition of a portion of the reaction mixture recovered onto a watch glass. The reaction was discontinued when the recovered portion showed a clear appearance. The period from the beginning of the distillation of alcohol up to the termination of the reaction was about 2 hours. After the reaction was terminated, the reaction mixture was cooled to 100° C. and 600 g of toluene was added so that the soluble portion was dissolved in the toluene. The mixture was then subjected to filtration to give a transparent varnish of which the viscosity (25° C.) was 250 cP and the content of non-volatile ingredients was 50.5%.

EXAMPLE 2

300 g of an organopolysiloxane prepared in the manner described in Example 1, 700 g of Epicote 1002 (trade name, available from Shell Chemical) and 400 g of toluene were mixed, and heated to 80° C. so that the ingredients formed a homogeneous solution. To the solution was added 0.5 g of aluminum acetylacetonate, and the mixture was further heated. When the temperature reached 95° C., methyl alcohol produced upon reaction began to distill together with toluene. The reaction was then continued at 115° C. in the same manner as in Example 1. The reaction was discontinued when the reaction mixture turned clear. The period from the beginning of the distillation of alcohol up to the termination of the reaction was about 2.5 hours. After the reaction was terminated, the reaction mixture was cooled to 100° C. and 600 g of toluene was added so that the soluble portion was dissolved in the toluene. The mixture was then subjected to filtration to give a transparent varnish of which the viscosity (25° C.) was 130 cP and the content of non-volatile ingredients was 50.8%.

EXAMPLE 3

An epoxy-modified silicone resin was prepared in the same manner as in Example 1 except that the epoxy resin was changed from the Epicote 1001 to Epicote 1007 (trade name, available from Shell Chemical) and that the aluminum acetylacetonate was replaced with aluminum ethylacetoacetate (5 g). The reaction period was about 3 hours, and a transparent varnish of which viscosity (25° C.) was 250 cP and the content of non-volatile ingredients was 51.0% was obtained.

EXAMPLE 4

400 g of tetraethoxysilane, 600 g of phenol-novolak epoxy resin, an ortho-cresol-novolak resin having the following formula

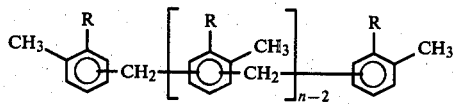

in which n was 11.3 (mean value), and in which R was glycidyloxy group for 70 mol % and hydroxyl group for the remaining portion, and 100 g of toluene were mixed, and heated to 80° C. so that the ingredients formed a homogeneous solution. To the solution was added 50 g of aluminum ethylacetoacetate, and the mixture was further heated. When the temperature reached 100° C., ethyl alcohol began to distill. The reaction was discontinued when the reaction mixture turned clear, as in Example 1. When the reaction was terminated, the temperature of the reaction mixture reached 125° C. The period required for the reaction was about 2.5 hours. To the reaction mixture was then added 800 g of toluene, and the mixture was subjected to filtration to give a transparent varnish of which the viscosity (25° C.) was 200 cP and the content of non-volatile ingredients was 50.5%.

EXAMPLE 5

A silane mixture consisting of 2 mol of dimethyldichlorosilane, 1 mol of vinyltrichlorosilane, 1 mol of phenyltrichlorosilane and 2 mol of diphenyldichlorosilane was alkoxylated with 5.2 mol of water and 3.6 mol of methyl alcohol under removal of by-produced hydrochloric acid to give an organopolysiloxane having the mean constitutional formula:

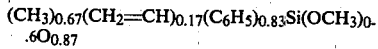
$(CH_3)_{0.67}(CH_2=CH)_{0.17}(C_6H_5)_{0.83}Si(OCH_3)_{0.6}O_{0.87}$

The so prepared organopolysiloxane was treated in the same manner as in Example 1 to give an epoxy-modified silicone resin.

EXAMPLE 6

An epoxy-modified silicone resin was prepared in the same manner as in Example 1 except that the Epicote 1001 was replaced with the ortho-cresol-novolak resin identified in Example 4 (700 g) and that the aluminum acetylacetonate was replaced with zirconium acetylacetonate (10 g). The reaction period was about 3.5 hours. To the reaction mixture was added 400 g of toluene to dissolve the mixture and the mixture was then subjected to filtration to give a transparent varnish of which the viscosity (25° C.) was 80 cP and the content of non-volatile ingredients was 49.5%.

COMPARATIVE EXAMPLE 1

An epoxy-modified silicone resin was prepared in the same manner as in Example 2 except that the aluminum acetylacetonate employed as the catalyst was replaced with a combination of 1.5 g of tetrabutyl titanate and 13 g of sodium chloride. The alcohol began to distill at 110° C. The period required for the reaction mixture to become clear was 8 hours, and the temperature reached 125° C. There was obtained an epoxy-modified silicone resin of which the viscosity (25° C.) was 200 cP and the content of non-volatile ingredients was 50.5%.

COMPARATIVE EXAMPLE 2

An epoxy-modified silicone resin was prepared in the same manner as in Comparative Example 1. The reaction mixture was then cooled before the addition of toluene, and subsequently 57.4 g of phthalic anhydride was added to undergo the reaction. The reaction was discontinued before gelation took place. A varnish was obtained.

COMPARATIVE EXAMPLE 3

A silane mixture corresponding to the mixture employed in Example 1 was dissolved in xylene, and the so prepared xylene solution was dropped into a mixture of xylene and an excess amount of water to undergo hydrolysis and condensation. After the procedure was complete, the reaction mixture was subjected to washing, neutralization, dehydration and devolatilization in the conventional manners to give an organopolysiloxane having the mean constitutional formula $(CH_3)_{0.67}(C_6H_5)_{1.00}Si(OH)_{0.47}O_{0.93}$ in the form of the 50% xylene solution.

The reaction was carried out in the same manner as in Example 1 except that the organopolysiloxane employed in Example 1 was replaced with the above-obtained organopolysiloxane solution (600 g) and that the toluene was not employed, for the purpose of causing the reaction between this organopolysiloxane and Epicote 1001. The result was as follows:

(1) The reaction mixture was heated to 110°–120° C., as the reaction proceeded. As the temperature was elevated, the reaction mixture rapidly produced gelling masses. Thus, no solution of the epoxy-modified silicone resin was obtained in a stable state.

(2) The reaction was then carried out at 90°–100° C. Reaction for 1 hour gave a xylene solution of the silicone resin modified with epoxy groups. This solution turned into a gel upon being allowed to stand at room temperature for 2 days.

Tests for properties of coated films

Each of the varnishes prepared in Examples 1–6 and Comparative Examples 1–2 was coated on mild steel (according to JIS G 3141) by spray coating so that the coated film was of the thickness of 20–25μ. The coated film was then dried and fused at 150° C. for 30 min. The sample thus obtained was subjected to the following tests for physical properties; chemical resistance tests against 5% aqueous sodium hydroxide solution (immersion for 7 days) and 5% aqueous sulfuric acid (immersion for 7 days); a solvent resistance test against toluene (immersion for 5 min.); a boiling-water resistance test (immersion for 24 hours); and a test for physical properties after heating to 200° C. for 3 days.

The results of the tests are shown in Table 1.

TABLE 1

| | Ex. 1 | Ex. 2 | Ex. 3 | Ex. 4 | Ex. 5 | Ex. 6 | Com. 1 | Com. 2 |
|---|---|---|---|---|---|---|---|---|
| Physical properties: | | | | | | | | |
| Cross-cut peel adhesion test | 100/100 | 100/100 | 100/100 | 100/100 | 100/100 | 100/100 | 50/100 | 100/100 |
| Bending test (3 mm φ) | No visible change | No visible change | No visible change | No visible change | No visible change | No visible change | Crack at bending portion | Crack at bending portion |
| Pencil hardness | H-2H | H-2H | H-2H | H-2H | H-2H | H-2H | B | H |
| Erichsen test | >8 | >8 | >8 | >8 | >8 | >8 | >8 | >8 |
| Resistance to: | | | | | | | | |
| Aqueous sodium hydroxide solution | No visible change | No visible change | No visible change | No visible change | No visible change | No visible change | No visible change | Peeling off of coated film |
| Aqueous sulfuric acid | No visible change | No visible change | No visible change | No visible change | No visible change | No visible change | No visible change | Peeling off of coated film |
| Toluene | No visible change | No visible change | No visible change | No visible change | No visible change | No visible change | Dissolution of coated film | No visible change |
| Boiling water | No visible change | No visible change | No visible change | No visible change | No visible change | No visible change | Swelled | No visible change |
| Physical properties after heat aging: | | | | | | | | |
| Cross-cut peel adhesion test | 100/100 | 100/100 | 100/100 | 100/100 | 100/100 | 100/100 | 100/100 | 50/100 |
| Bending test (3 mm φ) | No visible change | No visible change | No visible change | No visible change | No visible change | No visible change | No visible change | Peeling off at bending portion |

TABLE 1-continued

|  | Ex. 1 | Ex. 2 | Ex. 3 | Ex. 4 | Ex. 5 | Ex. 6 | Com. 1 | Com. 2 |
|---|---|---|---|---|---|---|---|---|
| Erichsen test | 7.5 | 7.0 | 7.8 | 7.4 | 7.2 | 6.9 | 5.4 | 3.5 |

I claim:

1. A process for preparing an epoxy-modified silicone resin which comprises reacting
   (A) an organosilicon material containing substantially no hydroxyl groups directly bonded to silicon and having the formula:
   $$R^1_a Si(OR^2)_b O_{(4-a-b)/2}$$
   in which $R^1$ and $R^2$ are substituted or unsubstituted monovalent hydrocarbon groups, and a and b are in the ranges of $0 \leq a < 3$, $0.001 \leq b \leq 4$, and $a + b \leq 4$,
   with
   (B) an epoxy compound containing at least one epoxy group and at least one hydroxyl group in a molecule,
   in the presence of
   (C) a catalytically effective amount of a chelate compound selected from the group consisting of aluminum chelates and zirconium chelates, under conditions effective to cause dealcoholation condensation reaction between the hydroxyl group of said epoxy compound and the $OR^2$ groups of said organosilicon material.

2. A process as claimed in claim 1, in which $R^1$ is selected from the group consisting of methyl, phenyl and mixtures thereof.

3. A process as claimed in claim 1 or claim 2, in which $R^2$ is selected from the group consisting of methyl, ethyl and propyl.

4. A process as claimed in claim 1, in which a and b are in the ranges of $1 \leq a < 3$ and $0.3 \leq b \leq 4$.

5. A process as claimed in claim 1, in which said epoxy compound (B) is a bisphenol A epoxy resin.

6. A process as claimed in claim 1, in which the reaction is carried out between 10-80% by weight of the organosilicon material (A) and 90-20% by weight of the epoxy compound (B).

7. A process as claimed in claim 1, in which said catalyst is an aluminum chelate.

8. A process as claimed in claim 1, wherein said chelate compound is employed in an amount in the range of 0.005 to 50 parts by weight, per 100 parts by weight of the sum of the weights of said organosilicon material and said epoxy compound.

9. A process as claimed in claim 1, wherein said chelate compound is selected from the group consisting of aluminum acetylacetonate, aluminum ethylacetoacetate, aluminum isobutylate ethylacetoacetate, and zirconium acetylacetonate.

10. A process as claimed in claim 1, wherein said chelate compound is aluminum acetylacetonate.

11. A process as claimed in claim 9 in which the amount of said chelate compound is from 0.01 to 5.0 parts by weight per 100 parts by weight of the sum of the weights of said organosilicon material and said epoxy compound.

* * * * *